United States Patent
Wright et al.

(10) Patent No.: US 10,262,465 B2
(45) Date of Patent: Apr. 16, 2019

(54) INTERACTIVE CONTROL STATION

(71) Applicant: BAE Systems plc, London (GB)

(72) Inventors: Julian David Wright, Preston Lancanshire (GB); Nicholas Giacomo Robert Colosimo, Preston Lancanshire (GB); Christopher James Whiteford, Preston Lancanshire (GB); Heather Jean Page, Preston Lancanshire (GB); Mark Robert Goodall, South Gloucestershire (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 15/527,817

(22) PCT Filed: Nov. 9, 2015

(86) PCT No.: PCT/GB2015/053394
§ 371 (c)(1),
(2) Date: May 18, 2017

(87) PCT Pub. No.: WO2016/079472
PCT Pub. Date: May 26, 2016

(65) Prior Publication Data
US 2017/0316613 A1    Nov. 2, 2017

(30) Foreign Application Priority Data
Nov. 19, 2014    (GB) .................................. 1420572.8

(51) Int. Cl.
*G06T 19/00*    (2011.01)
*G06F 3/01*    (2006.01)
(Continued)

(52) U.S. Cl.
CPC .......... *G06T 19/006* (2013.01); *G02B 27/017* (2013.01); *G06F 3/011* (2013.01);
(Continued)

(58) Field of Classification Search
CPC ........ G06T 19/006; G06F 3/011; G06F 3/017; G06F 3/0425; G02B 2027/0127;
(Continued)

(56) References Cited

U.S. PATENT DOCUMENTS

| 5,423,554 A | 6/1995 | Davis |
| 6,108,031 A | 8/2000 | King et al. |

(Continued)

FOREIGN PATENT DOCUMENTS

| EP | 0911647 A2 | 4/1999 |
| EP | 2189200 A1 | 5/2010 |

(Continued)

OTHER PUBLICATIONS

International Preliminary Report on Patentability of PCT Application No. PCT/GB2015/053413, dated May 23, 2017, 10 pages.
(Continued)

*Primary Examiner* — Robert J Craddock
(74) *Attorney, Agent, or Firm* — Maine Cernota & Rardin

(57) ABSTRACT

A mixed reality system for creating a terminal control station enabling communication with and/or control of remote functions and applications, the system comprising a headset (100) for placing over a user's eyes, in use, said headset including a screen (102), the system further comprising a processor (104) configured to receive data from multiple sources and display said data on said screen within a three-dimensional virtual environment, and an input for receiving control information data from an external data source within the real world environment, said processor (104) being further configured to receive image data representative of said external data source and blend said image data into said three-dimensional virtual environment to create a mixed reality environment, including a representation of said external data source and said control information
(Continued)

data, to be displayed on said screen (102), the system being configured to allow a user, in use, to manipulate data displayed within said mixed reality environment.

19 Claims, 2 Drawing Sheets

(51) Int. Cl.
*G06F 3/042* (2006.01)
*G02B 27/01* (2006.01)

(52) U.S. Cl.
CPC ............ *G06F 3/017* (2013.01); *G06F 3/0425* (2013.01); *G02B 27/0172* (2013.01); *G02B 2027/014* (2013.01); *G02B 2027/0127* (2013.01); *G02B 2027/0187* (2013.01)

(58) Field of Classification Search
CPC ........ G02B 2027/0187; G02B 27/0172; G02B 2027/014
USPC .......................................................... 345/633
See application file for complete search history.

(56) References Cited

U.S. PATENT DOCUMENTS

| | | |
|---|---|---|
| 6,215,498 B1 | 4/2001 | Filo et al. |
| 7,180,476 B1 | 2/2007 | Guell et al. |
| 8,179,604 B1 | 5/2012 | Prada Gomez et al. |
| 9,380,270 B1 | 6/2016 | Worley, III |
| 2002/0080094 A1 | 6/2002 | Biocca et al. |
| 2004/0193413 A1 | 9/2004 | Wilson |
| 2005/0195128 A1 | 9/2005 | Volo |
| 2006/0050070 A1 | 3/2006 | Canon |
| 2007/0035561 A1 | 2/2007 | Bachelder |
| 2007/0101279 A1 | 5/2007 | Chaudhri |
| 2007/0247457 A1 | 10/2007 | Gustafsson et al. |
| 2010/0110069 A1 | 5/2010 | Yuan |
| 2011/0157016 A1 | 6/2011 | Chang |
| 2011/0213664 A1* | 9/2011 | Osterhout ............ G02B 27/017 705/14.58 |
| 2012/0015723 A1 | 1/2012 | Lai |
| 2012/0115598 A1 | 5/2012 | Hagstrom |
| 2012/0124516 A1 | 5/2012 | Friedman |
| 2012/0188155 A1 | 7/2012 | Eun |
| 2012/0249416 A1* | 10/2012 | Maciocci ................ G06F 3/011 345/156 |
| 2012/0262558 A1 | 10/2012 | Boger |
| 2013/0044912 A1 | 2/2013 | Kulkarni |
| 2013/0050069 A1 | 2/2013 | Ota |
| 2013/0249947 A1 | 9/2013 | Reitan |
| 2013/0257899 A1 | 10/2013 | Baron |
| 2014/0160165 A1 | 6/2014 | Kim et al. |
| 2014/0180508 A1 | 6/2014 | Zaneboni et al. |
| 2015/0092020 A1* | 4/2015 | Vaughn .............. H04N 13/0203 348/47 |
| 2015/0161762 A1 | 6/2015 | Fujiwara |
| 2017/0316613 A1 | 11/2017 | Wright |

FOREIGN PATENT DOCUMENTS

| | | |
|---|---|---|
| EP | 2267588 A2 | 12/2010 |
| EP | 2456203 A1 | 5/2012 |
| EP | 2693255 A1 | 2/2014 |
| GB | 2376397 A | 12/2002 |
| WO | 0161672 A1 | 8/2001 |
| WO | 2011081283 A1 | 7/2011 |

OTHER PUBLICATIONS

International Preliminary Report on Patentability of PCT Application No. PCT/GB2015/053394, dated May 23, 2017, 9 pages.
International Preliminary Report on Patentability of PCT Application No. PCT/GB2015/053398, dated May 23, 2017, 10 pages.
Search Report of Great Britain Patent Application No. GB1420572.8, dated May 18, 2015, 4 pages.
International Search Report and Written Opinion of PCT Application No. PCT/GB2015/053394, dated Jan. 19, 2016, 12 pages.
Search Report of Great Britain Application No. GB1420570.2, dated May 15, 2015, 3 pages.
International Search Report and Written Opinion of PCT Application No. PCT/GB2015/053413, dated Jan. 8, 2016, 16 pages.
Huagen Wan et al: "MRStudio: A mixed reality display system for aircraft cockpit", VR Innovation (ISVRI), 2011 IEEE International Symposium on, IEEE, Mar. 19, 2011, pp. 129-135, XP031861038.
Search Report of Great Britain Application No. GB1420571.0, dated May 20, 2015, 4 pages.
International Search Report and Written Opinion of PCT Application No. PCT/GB2015/053398, dated Jan. 11, 2015, 16 pages.
Anonymous: "Head-mounted display", Oct. 24, 2014, pp. 1-8, XP055239689, Retrived from the internet: URL: htpps://en.wikipedia.org/w/index.php?title=Head-mounted_display&oldid=630962860.
International Search Report and Written Opinion of International Application No. PCT/GB2016/050453, dated Apr. 1, 2016, 13 pages.
Hongbin Gu et al: "Development of a Novel Low-Cost Flight Simulator for Pilot Training", National Journal of Mechanical, Aerospace, Industrial, Mechatronic and Manufacturing Engineering vol. 3, Np:12, 2009, Dec. 31, 2009, pp. 1-5, XP055242896.
European Search Report of European Application No. EP15182891, dated Jan. 21, 2016, 8 pages.
Search Report under Section 17(5) of Great Britain application No. GB1503115.6, dated Aug. 25, 2015, 3 pages.
International Preliminary Report on Patentability of International Application No. PCT/GB20161050453, dated Aug. 29, 2017, 8 pages.
International Preliminary Report on Patentability of International Application No. PCT/GB20161050454, dated Aug. 29, 2017, 9 pages.
Kolsch et al., Touching the Visualized Invisibe: Wearable AR with a Multimodal Interface, Dec. 2006, p. 1-24.

* cited by examiner

INTERACTIVE CONTROL STATION

RELATED APPLICATIONS

This application is a National Phase application filed under 35 USC § 371 of PCT Application No. PCT/GB2015/053394 with an International filing date of Nov. 9, 2015 which claims priority of GB Patent Application 1420572.8 filed Nov. 19, 2014. Each of these applications is herein incorporated by reference in their entirety for all purposes.

This invention relates generally to an interactive control station and, more particularly to a configurable mixed reality control station for use in, for example, a UAV (Unmanned Aerial Vehicle) or aircraft ground station.

UAV and aircraft ground control stations are inevitably complex and have a significant requirement for infrastructure due to their need for highly specialised (and often bespoke) equipment, manpower and supporting systems in order to perform their required tasks. Such applications require one or more users to be able to view several data sources simultaneously in order to effectively perform a task and, conventionally, this type of information display has been facilitated by the provision of large display screens mounted around the walls of a room so that they can be viewed simultaneously by the occupants of the room, together with several different workstations for use by occupants of the room to control and manipulate the displayed data, as well as perform any other tasks necessitated by the data thus displayed.

Significant bespoke development is thus required in order to construct such a control station for a particular application, which in turn results in high initial and through-life costs. Furthermore, the cost of change is very high, thereby having an effect on the ability of an organisation to maintain pace with changing and improving capabilities, and restricting the ability to re-deploy the station for other uses, should that be desirable. Still further, housing and transportation of such complex, bespoke systems results in the requirement for a large and bulky facility, which can hamper the speed of deployment, and also tends to require the use of large generators, communications systems and other associated equipment and infrastructures.

Virtual reality systems are known, comprising a headset which, when placed over a user's eyes, creates and displays a three dimensional virtual environment in which a user feels immersed and with which a user can interact in a manner dependent on the application. For example, in some prior art systems, the virtual environment created may comprise a game zone, within which a user can play a game. As explained above, for applications such as UAV and aircraft ground control stations, large quantities of data from several different sources needs to be available to view simultaneously in order for a user to effectively perform the tasks required of them, and virtual reality systems have been developed which enable "screens" of information to be displayed within a three-dimensional virtual room, such that when a user places the headset over their eyes, they feel immersed within the virtual room having multiple data sources displayed simultaneously in three dimensions.

However, this type of system only addresses the issue of displaying multiple data sources simultaneously, it does not address the provision of the rest of the infrastructure and equipment required to provide a fully functional, complex control station.

More recently, augmented and mixed reality systems have been developed, wherein an image of a real world object can be captured, rendered and placed within a 3D virtual reality environment, such that it can be viewed and manipulated within that environment in the same way as virtual objects therein. Other so-called augmented reality systems exist, comprising a headset having a transparent or translucent visor which, when placed over a user's eyes, creates a three-dimensional virtual environment with which the user can interact, whilst still being able to view their real environment through the visor.

However, in an augmented reality environment, whereby the user can "see" all aspects of their real world environment through the visor as well as the multiple sources of data in the virtual environment, the resultant 3D environment becomes excessively cluttered and it becomes difficult for a user to focus on the important elements thereof.

It is an object of aspects of the invention to address at least some of these issues.

In accordance with a first aspect of the present invention, there is provided a mixed reality system for creating a terminal control station enabling communication with and/or control of remote functions and applications, the system comprising a headset for placing over a user's eyes, in use, said headset including a screen, the system further comprising a processor configured to receive data from multiple sources and display said data on said screen within a three-dimensional virtual environment, and an input for receiving control information data from an external data source within the real world environment, said processor being further configured to receive image data representative of said external data source and blend said image data into said three-dimensional virtual environment to create a mixed reality environment, including a representation of said external data source and said control information data, to be displayed on said screen, the system being configured to allow a user, in use, to manipulate data displayed within said mixed reality environment.

The processor may be preconfigured to display at least one component of said terminal control station, and data associated therewith, on said screen within said three-dimensional virtual environment. In other words, the processor would be pre-programmed to automatically include certain elements or components required for a particular terminal control station within the displayed three dimensional virtual environment, and update the data in relation thereto, without input from the user.

The system may be configured to allow a user, in use, to manipulate data displayed within said mixed reality environment by means of hand gestures. In one exemplary embodiment of the invention, the system may comprise a control panel or keyboard in respect of which a user can, in use, manually indicate data selection and manipulation commands, wherein said processor is configured to identify, from said captured images, said data selection and manipulation commands and generate control signals representative thereof.

The processor may be preconfigured to identify, from said captured images, at least one physical component of said terminal control station within said real world environment, and blend image data representative of said physical component into said three-dimensional virtual environment. In other words, the processor may be pre-programmed to identify and locate predetermined essential physical components or elements of the terminal control station, and automatically include them within the displayed three-dimensional virtual environment, without input from the user.

The system may comprise a pair of spatially separated image capture devices for capturing respective images of the real world environment in the vicinity of the user, said processor being configured to define a depth map using respective image frame pairs to produce three dimensional image data. The image capture devices may be mounted on said headset, in which case, the image capture devices may be mounted on said headset so as to be substantially aligned with a user's eyes, in use.

In an exemplary embodiment of the invention, the system may be configured to allow a user, in use, to select objects, portions or people from their real world environment to be included within said mixed reality environment by means of one or more predefined hand gestures.

Another aspect of the invention extends to a method of providing terminal control station enabling communication with and/or control of remote functions and applications, the method comprising providing a mixed reality system as defined above, configuring the processor to receive data from multiple sources and display said data on said screen within a three-dimensional virtual environment, receive control information data from an external data source within the real world environment, receive image data representative of said external data source, and blend said image data into said three-dimensional virtual environment to create a mixed reality environment, including a representation of said external data source and said control information data, to be displayed on said screen.

The terminal control station may be an aircraft or Unmanned Aerial Vehicle ground station, and the method may include the step of configuring the processor to receive image data representative of the real world environment, identify, from said image data, at least one physical component of said terminal control station within said real world environment, and blend image data representative of said physical component into said three-dimensional virtual environment. This optional feature may be particularly applicable to critical functions of the ground station which must, for safety or other reasons, be provided and manipulated in their physical form.

These and other aspects of the present invention will become apparent from the following specific description of exemplary embodiments of the present invention, which are described by way of examples only and with reference to the accompanying drawings, in which.

Figure 1:
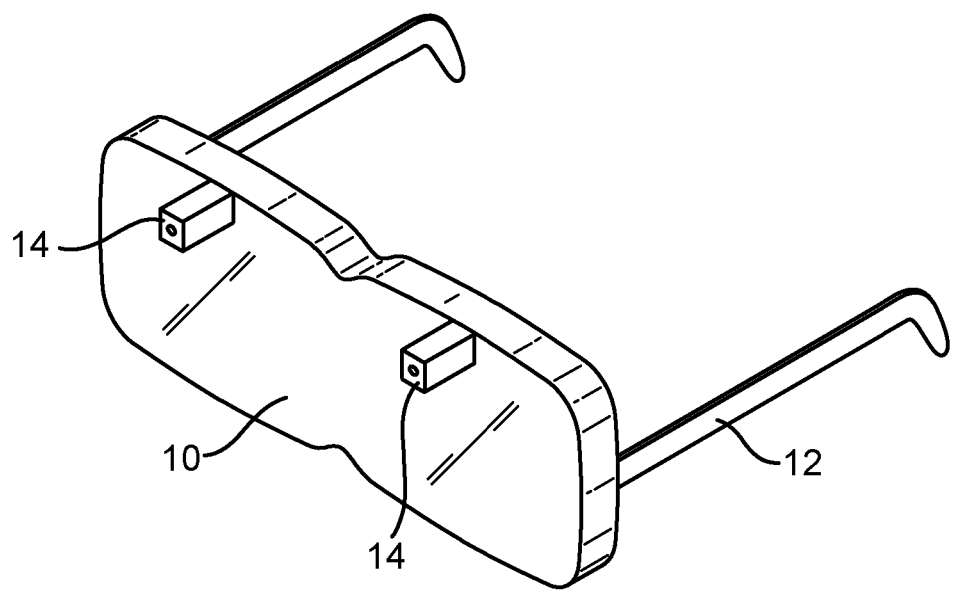
FIG. 1 is a front perspective view of a headset for use in a control system according to an exemplary embodiment of the present invention.

Referring to FIG. 1 of the drawings, a system according to an exemplary embodiment of the present invention may comprise a headset comprising a visor 10 having a pair of arms 12 hingedly attached at opposing sides thereof in order to allow the visor to be secured onto a user's head, over their eyes, in use, by placing the curved ends of the arms 12 over and behind the user's ears, in a manner similar to conventional spectacles. It will be appreciated that, whilst the headset is illustrated herein in the form of a visor, it may alternatively comprise a helmet for placing over a user's head, or even a pair of contact lenses or the like, for placing within a user's eyes, and the present invention is not intended to be in any way limited in this regard. Also provided on the headset, is a pair of image capture devices 14 for capturing images of the environment, such image capture devices being mounted as closely as possible aligned with the user's eyes, in use.

The system of the present invention further comprises a processor, which is communicably connected in some way to a screen which is provided inside the visor 10. Such communicable connection may be a hard wired electrical connection, in which case the processor and associated circuitry will also be mounted on the headset. However, in an alternative exemplary embodiment, the processor may be configured to wirelessly communicate with the visor, for example, by means of Bluetooth or similar wireless communication protocol, in which case, the processor need not be mounted on the headset but can instead be located remotely from the headset, with the relative allowable distance between them being dictated and limited only by the wireless communication protocol being employed. For example, the processor could be mounted on, or formed integrally with, the user's clothing, or instead located remotely from the user, either as a stand-alone unit or as an integral part of a larger control unit, for example.

Figure 2:
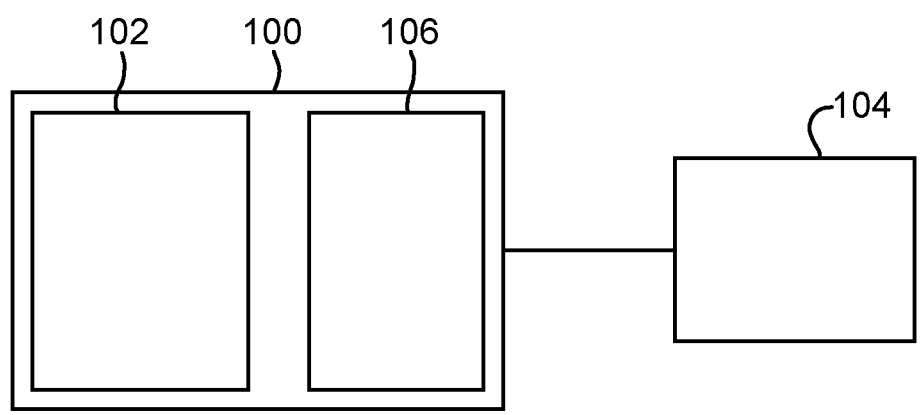
FIG. 2 is a schematic block diagram of a control system according to an exemplary embodiment of the present invention.

Referring to FIG. 2 of the drawings, a system according to an exemplary embodiment of the invention comprises, generally, a headset 100, incorporating a screen 102, a processor 104, and a pair of external digital image capture devices (only one shown) 106.

The processor 104 is configured to display multiple data items simultaneously within a three-dimensional (3D) virtual environment. Such data items may be received over a wide bandwidth data link from several different sources, via, for example, an Internet connection, a secure LAN, Bluetooth, or any other communications protocol, which may be wireless or otherwise. Thus, for example, such data items may include maps, communications feeds, national and international news feeds, radar and/or satellite feeds, feeds from CCTV cameras, etc., depending on the context in which the system is being used. The present invention is particularly suited to aircraft or UAV (unmanned aerial vehicle) ground station data, large portions of which are continuously or periodically being updated, thereby allowing a user to see real time updates within the virtual environment, but the invention is not necessarily intended to be limited in this regard, and is equally suited to other types of terminal control station applications where static data, in conjunction with or instead of changing data, is required to be displayed. Some of the data to be displayed and the manner in which the data is displayed within the 3D virtual environment may be pre-selected and configured by the user, together with the predefined data required as part of the control station designed and configured for a particular application.

Figure 3:
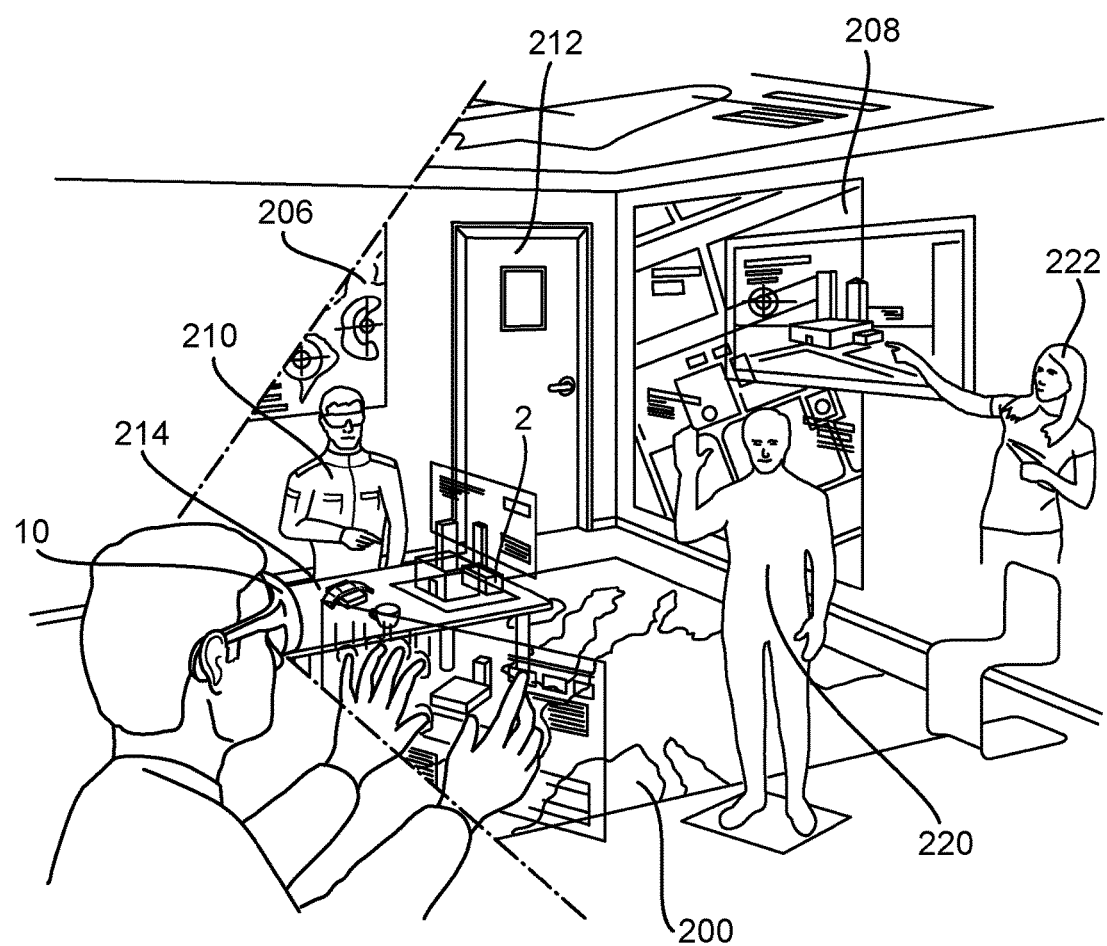
FIG. 3 is a schematic view of a mixed reality terminal control station environment created by a system according to an exemplary embodiment of the present invention.

Referring to FIG. 3 of the drawings, the user may be provided with a virtual environment containing a map 200, a live communications feed 202, a news feed (not shown) from an external broadcasting source, a radar feed 206 and a satellite feed 208. These data items may be predefined in relation to a terminal control station to which the system is being applied, but the user can configure these data items within the displayed environment in any way they wish to, simply by means of hand gestures, for example, as will be described in more detail later. Thus, for example, the user could select the map 200 and choose to place it in any location within the 3D virtual environment, for example on the "floor".

Digital video image frames of the user's real world environment are captured by the image capture devices provided on the headset, and two image capture devices are used in this exemplary embodiment to capture respective images such that the data representative thereof can be blended to produce a stereoscopic depth map which enables the processor to determine depth within the captured images without any additional infrastructure being required. The user can select portions or objects from these images to be blended into the virtual environment being displayed on the screen. Thus, in the example shown in FIG. 3 of the drawings, the user has selected the main entrance door 212, and the desk 214 at which their colleague 210 is sitting. In addition, the processor may also be configured to select portions or objects from the images to be automatically blended into the virtual environment as part of the overall configuration of the terminal control system application. For example, the processor may be configured to identify people 210 within the captured images, and automatically select and track the movement of those people within the captured images (although the selection of colleagues to appear within the user's virtual environment may alternatively or additionally be effected by the user themselves). In both cases, the selected features within the live captured video images are then rendered and blended to continuously update the virtual environment to reflect activity within the real environment, as will be described in more detail later.

In this way, the user can selectively "build" their virtual environment, within the confines of the preconfigured terminal control station constraints, in order to maintain their bearings within the real world and also to be able to maintain an awareness of the important things that are going on around them, such as movement and hand gestures by a selected colleague and/or people leaving and entering their real world environment.

Furthermore, the system may be preconfigured and/or the user may be able to select, how data from selected sources is displayed in their 3D virtual environment. Thus, for example, vocal data from a remote person may be presented within the user's virtual environment in the form of an avatar or holographic image 220 of a person speaking. Alternatively, if data is being received from a person in a remote location, image data representative of that person 222 and their immediate environment may be blended into the user's 3D virtual environment in real time.

The general concept of real time image blending for augmented reality is known, and several different techniques have been proposed. The present invention is not necessarily intended to be in any way limited in this regard. However, for completeness, one exemplary method for image blending will be briefly described. Thus, once an object has been selected from a real world image to be blended into the virtual environment, a threshold function may be applied in order to extract that object from the background image. Its relative location and orientation may also be extracted and preserved by means of marker data. Next, the image and marker data is converted to a binary image, possibly by means of adaptive thresholding (although other methods are known). The marker data and binary image are then transformed into a set of coordinates which match the location within the virtual environment in which they will be blended. Such blending is usually performed using black and white image data. Thus, if necessary, colour data sampled from the source image can be backward warped, using homography, to each pixel in the resultant virtual scene. All of these computational steps require minimal processing and time and can, therefore, be performed quickly and in real (or near real) time. Thus, if the selected object is moving, for example, a person, the corresponding image data within the virtual environment can be updated in real time.

As stated above, selection of real world elements from the captured images and also selection and manipulation of, and interaction with, the displayed data may be effected by, for example, hand gestures made by the user. Several different techniques for automated recognition of hand gestures are known, and the present invention is not in any way intended to be limited in this regard. For example, predefined hand gestures may be provided that are associated with specific actions, in which case, the processor is preconfigured to recognise those specific predefined hand gestures and cause the associated action to be performed in respect of the selected data item. Alternatively, a passive control panel or keyboard may be provided which the user "operates" like a normal keyboard or control panel, except that the user's actions in respect thereof are captured by the image capture devices, and the processor is configured to employ image recognition techniques to determine which keys or icons the user has pressed on the keyboard or control panel, and cause the required action to be performed in respect of the selected data item.

Either way, it will be appreciated that the image capture devices provided in the system described above can be used to capture video images of the user's hands (which can be selected to be blended into the 3D virtual environment displayed on the user's screen). Thus, one relatively simple method of automated hand gesture recognition and control using captured digital video images involves the use of a database of images of predefined hand gestures and the command to which they relate, or indeed a data base of images of predefined hand positions (in relation to a passive keyboard or control panel) and the action or "key" to which they relate. Thus, an auto threshold function is first performed on the image to extract the hand from the background. The wrist is then removed from the hand shape, using a so-called "blob" image superposed over the palm of the hand, to separate out the individual parts of the hand so that the edge of the blob defines the border of the image. The parts outside of the border (i.e. the wrist) are then removed from the image, following which shape recognition software can be used to extract and match the shape of a hand to a predefined hand gesture, or "markers" associated with the configuration of the keyboard or control panel can be used to determine the relative position and hand action, and call the associated command accordingly.

In the present invention, where the user has the ability to first select the area of the virtual environment they wish to manipulate before actually performing any manipulation, it is necessary to provide some form of direction and orientation sensing, such that it can be determined where in the virtual environment the user is pointing. This can be done by any known means, for example, by image recognition within the captured images of the user's hands relative to a marker within the image, or by means of an accelerometer or similar orientation sensor mounted or otherwise provided on or in relation to the user's arms or hands.

It will be appreciated that a user can, to a certain extent, configure their virtual environment according to personal preference within any constraints imposed by the pre-configuration of the control station to which the system is applied. Furthermore, the system can be relatively easily reconfigured, as required, without the need for costly hardware changes. Although it is possible to configure all of the functionality of a particular control station within the virtual environment, in some applications, there may be critical functions which, for safety, should remain in their real world configuration. In this case, the processor may be configured to identify, within the captured images, the location within the control station environment of that critical function 320, and automatically blend and retain an image thereof within the user's 3D virtual environment such that, if necessary, the user can see its location and can physically interact with it.

It will be appreciated by a person skilled in the art, from the foregoing description, that modifications and variations can be made to the described embodiments without departing from the scope of the present invention as claimed.

What is claimed is:

1. A mixed reality system for creating a terminal control station enabling communication with and/or control of remote functions and applications, the system comprising:
   a headset for placing over a user's eyes, in use, said headset including a screen, the system further comprising:
   a processor configured to receive data from multiple sources and display said data on said screen within a three-dimensional virtual environment;
   a pair of spatially separated image capture devices for capturing respective images of a real world environment in a vicinity of the user; and
   an input for receiving control information data from an external data source within the real world environment;
   applying a threshold function to extract said image data from a background image; and
   whereby all computational steps require minimal processing and time and are performed in at least near real time whereby selected moving object image data within said virtual environment is updated in at least near real time;
   said processor being further configured to receive image data representative of said external data source and blend said image data into said three-dimensional virtual environment to create a mixed reality environment, including a representation of said external data source and said control information data, to be displayed on said screen, the system being configured to allow a user, in use, to manipulate data displayed within said mixed reality environment.

2. The system according to claim 1, wherein the terminal control station comprises physical components associated therewith, and said processor is preconfigured to display at least one physical component of said terminal control station, and data associated therewith, on said screen within said three-dimensional virtual environment.

3. The system according to claim 2, wherein said preconfigured display of said at least one physical component of said terminal control station comprises a critical function physical component of said terminal control station.

4. The system according to claim 2, wherein said preconfigured display of said at least one physical component of said terminal control station comprises a critical safety function physical component of said terminal control station.

5. The system according to claim 2, wherein said preconfigured display of said at least one physical component of said terminal control station comprises a critical safety function physical component of said terminal control station required to be manipulated in physical form.

6. The system according to claim 1, configured to allow a user, in use, to manipulate data displayed within said mixed reality environment by means of hand gestures.

7. The system according to claim 6, further comprising a control panel or keyboard in respect of which a user can, in use, manually indicate data selection and manipulation commands, wherein said processor is configured to identify from said captured images said data selection and manipulation commands and generate control signals representative thereof.

8. The system according to claim 1, wherein said processor is preconfigured to identify, from said captured images, at least one physical component of said terminal control station within said real world environment, and blend image data representative of said physical component into said three-dimensional virtual environment.

9. The system according to claim 1, said processor being further configured to define a depth map using respective image frame pairs to produce three dimensional image data.

10. The system according to claim 9, wherein said image capture devices are mounted on said headset.

11. The system according to claim 10, wherein said image capture devices are mounted on said headset so as to be substantially aligned with a user's eyes, in use.

12. The system according to claim 1, configured to allow a user, in use, to select objects, portions or people from their real world environment to be included within said mixed reality environment by means of one or more predefined hand gestures.

13. A method of providing a terminal control station enabling communication with and/or control of remote functions and applications, the method comprising:
   providing a mixed reality system according to claim 1;
   configuring the processor to receive data from multiple sources and display said data on said screen within a three-dimensional virtual environment;
   receiving control information data from an external data source within the real world environment;
   receiving image data representative of said external data source; and
   blending said image data into said three-dimensional virtual environment to create a mixed reality environment, including a representation of said external data source and said control information data, to be displayed on said screen.

14. The method according to claim 13, wherein said terminal control station is an aircraft or Unmanned Aerial Vehicle ground station, and the method includes the step of configuring the processor to receive image data representative of the real world environment, identify, from said image data, at least one physical component of said terminal control station within said real world environment, and blend image data representative of said physical component into said three-dimensional virtual environment.

15. The system according to claim 1, wherein said blending of said image data comprises:
   marker data whereby relative location and orientation are extracted and preserved; and
   whereby all computational steps require minimal processing and time and are performed in at least near real time whereby selected moving object image data within said virtual environment is updated in at least near real time.

16. The system according to claim 1, wherein said blending of said image data comprises:
   marker data whereby relative location and orientation are extracted and preserved;
   adaptive thresholding whereby said image data and said marker data is converted to a binary image; and
   transforming said marker data and said binary image into a set of coordinates which match a location within said three-dimensional virtual environment;
   whereby all computational steps require minimal processing and time and are performed in at least near real time whereby selected moving object image data within said virtual environment is updated in at least near real time.

17. The system according to claim 1, wherein said blending of said image data comprises:
   using black and white image data; and
   wherein colour data sampled from said source image is backward warped using homography, to each pixel in a resultant virtual scene;
   whereby all computational steps require minimal processing and time and are performed in at least near real time whereby selected moving object image data within said virtual environment is updated in at least near real time.

18. The system according to claim 1, wherein said terminal control station is preconfigured to constrain said user from configuring said terminal control station for at least one function.

19. A mixed reality Unmanned Aerial Vehicle (UAV) terminal control ground station enabling communication with and/or control of remote functions and applications, the station comprising:
   a headset for placing over a user's eyes, in use, said headset including a screen, the system further comprising:
   a processor configured to receive data from multiple sources and display said data on said screen within a three-dimensional virtual environment;
   a pair of spatially separated image capture devices for capturing respective images of a real world environment in a vicinity of the user; and
   an input for receiving control information data from an external data source within the real world environment;
   said processor being further configured to receive image data representative of said external data source and blend said image data into said three-dimensional virtual environment to create a mixed reality environment, including a representation of said external data source and said control information data, to be displayed on said screen, the system being configured to allow a user, in use, to manipulate data displayed within said mixed reality environment;
   wherein said blending of said image data comprises:
      applying a threshold function to extract said image data from a background image;
      marker data whereby relative location and orientation are extracted and preserved;
      adaptive thresholding whereby said image data and said marker data is converted to a binary image;
      transforming said marker data and said binary image into a set of coordinates which match a location within the virtual environment;
      using black and white image data; and
      wherein colour data sampled from said source image is backward warped using homography, to each pixel in a resultant virtual scene;
      whereby all computational steps require minimal processing and time and are performed in at least near real time whereby selected moving object image data within said virtual environment is updated in at least near real time;
   wherein said preconfigured display of said at least one physical component of said terminal control station comprises a critical safety function physical component of said terminal control station required to be manipulated in physical form;
   wherein preconfiguration of said preconfigured display of said critical safety function physical component of said terminal control station constrains said user from configuring said preconfigured display of said critical safety function physical component;
   whereby said UAV is remotely controlled from said ground station.

* * * * *